United States Patent Office 3,475,358
Patented Oct. 28, 1969

3,475,358
ANTI-THROMBOGENIC MATERIAL
Harris J. Bixler, Lexington, Robert A. Cross, Waltham, and Lita L. Markley, Belmont, Mass., assignors to Amicon Corporation, Lexington, Mass., a corporation of Massachusetts
No Drawing. Filed Oct. 31, 1967, Ser. No. 679,566
Int. Cl. C08f 47/12
U.S. Cl. 260—17.4          6 Claims

ABSTRACT OF THE DISCLOSURE

Articles, and process for preparing said articles, which comprise an anti-thrombogenic surface formed of an ionically-crosslinked polyelectrolyte complex of a polyanion and a polycation which resin contains an excess of anion groups on the polyanion over cation groups on the polycation.

BACKGROUND OF THE INVENTION

With the acceleration of medical research into areas requiring the processing of blood, there has been a concurrent growth in the effort to find suitable materials of construction with which blood can be contacted without undesirable effect on either the blood or the materials. Ordinary plastic materials of construction are not generally suitable for long term contact with blood. Thus many types of exotic surface treatments have been tried in an effort to provide modified plastic surfaces which do not promote the coagulation of blood or other undesirable phenomena when the surfaces are used as conduits for a circulating blood stream or for other blood-contacting applications. For example, see the article entitled "A Permanent Autologous Lining for Implantable Blood Pumps: A Pseudoendocardium" appearing in the Cardiovascular Research Center Bulletin of January–March 1966 wherein the problems of blood protein deposition in blood pumps and some attempts to avoid such deposition are discussed in some detail.

Generally, the prior art has found that plastics and resins are thrombogenic, that is they cause damage to blood by promoting clotting. Although polyamides and polyurethane are particularly undesirable in blood contacting applications, it is also true that the highly-inert plastics resins such as silicones and polyhaloolefins generally known for their anti-stick properties are also too thrombogenic for long-term use such as required in heart pumps and the like.

One of the paths followed in the prior art was the coating of plastic surfaces with a naturally-occurring sulfated polysaccharide, heparin. Heparin is a powerful anticoagulant which has been used as such for many years. Very complex chemical processes are required to achieve heparin coatings. For example, one such process involves coating heparin on a polystyrene surface by a procedure which includes a chloromethylation of the surface molecules of the polystyrene with chloromethyl ether and aluminum chloride, followed by reacting the resulting chloromethyl groups with tertiaryamines to give quaternary ammonium sites which sites are subsequently bonded to the sulfate groups of heparin. Such a treatment can be applied to the surface of an article only and is, of course, like all coatings, subject to wear and damage. Other suggestions for non-thrombogenic materials include the use of polyelectrolyte complex resins having excess polycation as clotting retardants; in general, however, no practical solution to the problem has heretofore been found.

SUMMARY OF THE INVENTION

Therefore, it is an object of the instant invention to provide a more homogeneous material which shows a surprisingly high degree of anti-thrombogenic behavior.

It is a further object to provide shaped articles having non-thrombogenic surfaces and to provide processes for forming these articles.

Another object of the invention is to provide a process for making anti-thrombogenic polyelectrolyte complex resin gels.

Other objects of the invention will be obvious to those skilled in the art on reading the instant specification.

The above objects have been largely accomplished as a result of the discovery that ionically-crosslinked polyelectrolyte complex resins comprising an excess of milliequivalents of residual anion groups attached to the polyanions over milliequivalents of residual cation groups attached to the polycations have extraordinary anti-thrombogenic properties. By polyelectrolyte complex resins are meant those compositions formed of two synthetic oppositely charged organic polyelectrolytes ionically crosslinked to each other. By residual anion and cation groups are meant those not involved in ionic bonds of the type which form the bonding between polyanion and polycation.

These polyelectrolyte complex resins of the invention can be used to form, or to form coatings on, such articles as artificial hearts, heart valves, arterial grafts, blood pumps, tubes for such apparatus as artificial kidneys and the like.

Among the dissociable polycations which may be used as ingredients in preparing the ionically crosslinked polyelectrolytes useful in the present invention are poly(vinyl benzyl trimethylammonium chloride), poly(ethylene methyloxonium) chloride, poly(vinyl dimethyloxonium) chloride, poly(vinyl benzyldimethyl sulfonium) chloride, poly(vinyl benzyltrimethyl phosphonium) chloride, poly-(vinyl dimethyloxonium) chloride, polyvinyl pyridinium chloride, poly(diallyl dimethyl ammonium chloride), the heterocyclic amine polycation sold under the trade designation Ionac PP–2021 by Ionac Corporation, a Division of Ritter-Pfaudler, Inc., and the like. Among the dissociable polyanions which may be used in preparing the polyelectrolyte used in the present invention are poly-(alpha-fluoro acrylic acid), poly(2,2-dichloro-3 butenoic acid), poly(4-vinyl-phenyl difluoro acetic acid), polyvinyl sulfuric acid, polyvinyl sulfonic acid, polyvinyl methylol sulfonic acid, poly-alpha-methylstyrene sulfonic acid, and the dissociable salts of such acids, preferably the sodium, potassium or ammonium salts thereof. Of these the sulfonic acid polymers and their alkali metal salts are most advantageous.

The polyelectrolyte complex resin gels of the invention advantageously contain from 25 to 95 percent water by weight. These resins are equilibrated in 1% sodium chloride solution, or Ringer's solution, before use. Such equilibration reduces the osmotic pressure of the water contained in the polyelectrolyte resin gel to physiologically-tolerable levels.

The anti-thrombogenic behavior has been realized at polyanion levels at from about 0.1 to 2.0 milliequivalents excess residual anion groups per dry gram of resin, but most advantageously from about 0.2 to 1.0, milliequivalent of excess anion groups attached to polyanion chains over milliequivalents of cation groups attached to polycation chains per dry gram of polyelectrolyte complex resin. The most advantageous range of anion excess, i.e., the range that appears to give suitably anti-thrombogenic utility in very severe applications is from about 0.4 to about 0.7 milliequivalent of excess polyanion-associated anion per dry gram of polyelectrolyte complex resin.

Materials of the invention can be prepared which are extensible, having 40% to 200% elongations to break at strain rates of 10 inches per minute at 25° C.

The polyelectrolytes used to form the polyelectrolyte complex resins of the invention should be free of undue quantities of monomer and salts; however, such purification is not always necessary. Thus industrial grade polyelectrolytes are desirably purified before use in forming products according to the invention.

The ionically crosslinked polyelectrolyte complex resins may be prepared as described in the copending application of Michaels et al. Ser. No. 610,166 by dissolving both purified organic linear polymer containing anionic groups, and the polymer containing cationic groups in an aqueous medium containing sufficient ion shielding electrolyte to maintain the two polymers in solution. The aqueous medium may be water alone or it may be a mixture of water with a relatively low-polarity miscible liquid. The shielding electrolyte may be a salt, acid, or base and must be present in the solution in an amount at least 10% by weight of the total solution, preferably at least 20% by weight. The electrolytes preferably employed are those which are soluble in water to the extent of at least 10% by weight at room temperature, which are highly ionized in aqueous solution and have a pK less than 2.0, and which contain no ions which interact with the polyelectrolytes to precipitate them. A variety of alkali metal, alkaline earth metal, and other metal salts as well as tetramethylammonium and lower-alkyl-pyridinium salts, such as the chlorides, bromides, nitrates and sulfates may be used. Acids which may be used include, among others, hydrochloric, hydrobromic, nitric, sulfuric, etc. and the useful bases include alkali metal hydroxides, barium hydroxides, tetramethylammonium hydroxide, and others. The relatively low polarity liquid is preferably an organic solvent having a volatility approximately as great as that of water or even greater. Suitable solvents include, among other, acetone, dioxane, methanol, ethanol, isopropanol, tert.-butyl alcohol, pyridine, morpholine, and other such solvents, in amounts up to 40% by weight of the total aqueous solution.

The ionically crosslinked polyelectrolyte complex resin may be obtained from the solution thus prepared by reducing the activity of the shielding electrolyte. This reduction in activity may be accomplished by cooling the solution, or by evaporation of a liquid component, e.g. water or solvent, from the solution, or by evaporating a portion of the shielding electrolyte if it be volatile, or by diluting the solution, or by contacting the solution with water, or other suitable solvent to extract the micro ions, or by neutralization of acids or bases when they are employed as the shielding electrolyte.

Ionically crosslinked polyelectrolyte complex resin may also be prepared by first preparing separate aqueous solutions of the organic linear polymer containing anionic groups and of the organic linear polymer containing cationic groups, the concentration of each such solution preferably being from 2% to 20% by weight. The separate solutions of polymers are then introduced simultaneously into a large mass of water, the rate of addition of each solution being adjusted so that the two reactive polymers are present in the desired proportions at all times. The mass of water into which the two solutions are mixed must be sufficiently large so that the total amount of water in the mixture at any time during the procedure is at least 500 times the weight of any free unreacted polymer before it has reacted to form an ionically crosslinked polyelectrolyte polymer.

The reaction mixture is stirred vigorously and effectively throughout the course of addition of the two reactive polymer solutions until the two polymers have reacted to form the ionically crosslinked polyelectrolyte in finely divided solid form, i.e. in the form of a flocculent precipitate which may be separated from the reaction mixture by any conventional procedure such as filtration, centrifugation, etc., the filter cake or other mass of divided solid material preferably being washed with water in order to remove any residual impurities present in the mother liquor.

After the polymer is initially formed, it is conveniently separated from the liquid reaction medium, washed with water to remove any excess salts, monomer or solvent; and washed with a drying solvent, e.g. acetone, to remove any residual moisture.

The polyelectrolyte complex resin is then dissolved at 25° C. in a solution containing 4 parts by weight of HCl, 4 parts by weight of dioxane, 1 part by weight of water, and 1 part by weight of sulfuric acid. Ten percent solutions of the resin are conveniently used for both coating operations and formation of solid polyelectrolyte complex resins shaped objects. Such objects as are described in this application are formed by dipping a glass rod into the indicated solution, allowing the solvent to evaporate from the rod thereby leaving a coat of resin thereon, and then repeating the step a number of times until the desired thickness of polyelectrolyte complex resin coats the rod. The resin is then removed by first soaking the coated rod in water, then soaking it in a concentrated aqueous solution of sodium hydroxide, then pushing the resulting cylinder of polyelectrolyte complex resin off from the glass rods, and cutting the resultant cylinder into rings of the desired size.

EXAMPLES OF THE PROCESS OF THE INVENTION

The testing of the polyelectrolyte complex resins was carried out by implanting a small ring, either formed from or coated with the test material, in a canine thoracic inferior vena cava.

This test was selected as particularly severe because the ascending vena cava is a location in which the most severe clotting around foreign objects is usually experienced. In addition, dogs' blood is known to clot considerably more easily than human blood. Test dogs were sacrificed after a period of time and the rings then examined for the presence of blood clots thereon.

When the articles of the invention are formed of polyelectrolyte complex resin-coated substrates, glass and polyolefins such as polyethylene and polypropylene are particularly advantageous as substrates because they combine particularly good resistance to corrosion and particularly good adhesive-bond-forming characteristics.

It is believed that no other synthetic, non-heparinized anti-thrombogenic material has remained unclotted in the canine vena cava as long as the polyelectrolyte complex resins described herein.

The following working examples are illustrative of the products of the invention and the processes by which they may be prepared. Various conditions and reactants can be changed as indicated in this disclosure.

EXAMPLE 1

Into a 3-gallon polyolefin container is charged three lbs. of commercial poly(sodiumstyrene sulfonate), a polyanion. The container is then filled to about 60% of its capacity with a 90:10 mixture of methanol: distilled water. The resulting mixture is agitated to leach the polyanion. Eight hours leaching in a ball mill (without balls) is sufficient. The resultant mixture is filtered, in several increments, using a large Buchner funnel and No. 1 filter paper. A filter cake is formed and any pasty-grayish substance on top of this cake is discarded after filtering of each increment. Clean filter paper is used with each increment. This entire procedure is repeated at least two more times. Then, the polyanion is placed in a Pyrex tray and dried at a temperature below 150° F.

The commercially-available solution of poly(vinylbenzyltrimethyl-ammonium chloride) described above is treated with 4 parts of acetone to precipitate the polycation therefrom. The remaining acetone-water solution is decanted and several acetone washings are carried out until the acetone is no longer cloudy. Then the precipitated and washed polycation is dried at about 150° F. When dry, the material is redissolved in distilled water and the precipitation, washing and drying steps are repeated. After this second drying, the material is ground to a 40–50 mesh powder in a ball mill.

Solutions are made up as follows:

Polyanion solution

| | Grams |
|---|---|
| Distilled $H_2O$ | 100 |
| Concentrated $H_2SO_4$ | 3000 |
| Polyanion | 292 |
| Certified ACS acetone | 3000 |

Polycation solution

| | Grams |
|---|---|
| Distilled $H_2O$ | 2000 |
| Concentrated $H_2SO_4$ | 1500 |
| Prepurified polycation | 550 |
| Certified ACS acetone | 1500 |

The polyanion is best put into solution at a temperature below 35° C. to avoid undesirable side reactions.

Five parts of the polyanion solution and 2 parts of the polycation solution are mixed together to form a very viscous material. This material is gravity-extruded into water to form spagetti-like strands. These strands are leached until the wash water is essentially neutral.

These strands are mulched in a 10% hydrochloric acid solution for a moment (1–2 seconds is optimum) in a Waring Blendor and washed with 10% hydrochloric several times. The resulting material is washed with acetone until all water has been removed, that is when the specific gravity of the acetone filtrate is 0.80+.05. The material so washed is dried overnight in an oven below 150° F., ground to a homogeneous powder.

When tested for polyanion excess, it was found to have an excess of 0.5 milliequivalent of anion groups associated with polyanion component of the polyelectrolyte complex resin.

Determination of excess anion is determined by measuring the hydrogen ion content of the finished polyelectrolyte complex. These hydrogen ions are assumed to be ionically associated with either (1) the sulfonate groups on the polyanion which are not crosslinked with the polycation or (2) any chloride ions left in the resin. Thus the anion excess is determined by first finding the total hydrogen ion content thereof, determining the chloride ion concentration, and subtracting that amount of hydrogen ion which could be (and must be assumed to be) tied up with chloride ions from the total amount of hydrogen ion. The difference is assumed to be equal to the quantity of anionic groups on the polyanion which groups are neither tied up with cation groups of a polycation nor with chloride. The determination:

A gram of polyelectrolyte resin (ground to pass 200 mesh) is placed in a 100 ml. beaker with 20 ml. of distilled water and 15 cc. of 0.1 N sodium hydroxide. This mixture is stirred at about 25° C. for 30 minutes. Then phenolphthalein indicator is added and the mixture is titrated with 0.1 N solution of sulfuric acid to the phenolphthalein end point. Total hydrogen ion milliequivalents are calculated according to the relation:

$$\frac{(cc. \text{ of NaOH})(0.1) - (cc. \text{ of } H_2SO_4)(0.1)}{1 \text{ gram of resin}}$$

The determination of chloride ion is carried out by placing a gram of resin (again ground to 200 mesh) in a 4-ounce jar with 20 cc. of 6 N potassium nitrate. It may be necessary to heat the solution to dissolve the nitrate salt. The solution was filtered through 0.45 millipore paper. The resulting filter cake is washed with distilled water and the wash water is added to the filtrate. Then 15.0 cc. of 0.1 N silver nitrate solution is added to the filtrate and wash mixture. The mixture so obtained is again filtered, washed, and again the wash water is added to the filtrate. Two cc. of ferric nitrate indicator is added to the resulting solution and it is titrated with 0.1 N potassium thiocyanate solution. The end point is reached when the solution turns reddish orange. Total chloride ion content is calculated according to the relation:

$Cl^-$ milliequivalents =

$$\frac{(cc. \text{ } AgNO_3)(0.1) - cc. \text{ } KCNS(0.1)}{gram \text{ } resin}$$

As indicated above, the "excess anion" milliequivalents are equal to the difference between the hydrogen ion and chloride ion values.

EXAMPLE 2

The resin of Example 1 was coated approximately 5 mils thick on a polycarbonate ring (Lexan) substrate and placed (unsterilized) into the vena cava of a dog. No clotting was observed after a two hour in vivo test. The ring had a length of about 10 millimeters and an outside diameter of about 8 millimeters.

The test was repeated several times with different rings without any clotting being experienced. One repeated test resulted in a small amount of blood coagulating on the ring.

EXAMPLE 3

The same test as described in Example 2 was run three additional times, but each time modified so that there was but 0.1 milliequivalent of excess polyanion-associated anion per gram of polyelectrolyte complex resin. Two of the rings showed no clotting at all; a small amount of clotting was detected on a third ring.

EXAMPLE 4

The test described in Example 2 was repeated in four dogs using neutral polyelectrolyte complex resin, that is, using a polyelectrolyte complex resin in which the anion and cation groups were stoichiometrically balanced. One ring showed very severe clotting, two showed moderately severe clotting, and a fourth showed little or no clotting of blood.

EXAMPLE 5

The test described in Example 2 was repeated except that the polyelectrolyte complex resin used had a 0.5 milliequivalent per gram of cation groups having an excess of anion groups associated with the polycation over the anion groups associated with the polyanion. The test ring clotted severely.

EXAMPLE 6

A gram of sodium heparin was dissolved in 100 grams of a shielding solvent consisting of 1.5 parts sodium bromide, one part acetone, and 3.3 parts water. A 2% solution of poly(vinylbenzyl trimethylammonium chloride) in water was added to the heparin solution. A white precipitate—that was neither tacky nor gummy was formed upon this addition. This precipitate—a water-insoluble complex of heparin and poly(vinylbenzyl trimethylammonium chloride) was then washed in a solution containing 0.86% NaCl in water.

Fifteen milligrams of the heparin complex described in Example 6 was added to 1 ml. of recalcified human ACD plasma in a glass test tube. No clotting occurred even after an hour.

Although the test results included above indicate the excellent anti-thrombogenic properties of the polyelectrolyte complex resins prepared according to the invention, the fact is that their promise is considerably greater than that to be inferred from the test results as reported. For example, those test rings which had small clots (in Example 3 for example) had such clots on the atrial edges of the rings and these clots were to be largely attributed to imperfect insertion techniques resulting in slight traumatization of the vena cava.

Moreover, in other tests, rings which had blunt rather than tapered edges also survived unclotted. Such blunt edges would have been expected to promote clotting.

It has been a problem to provide for the adequate sterilization of polyelectrolyte complex resins used in these biomedical applications. Conventional charged bacteriocidal agents irreversibly absorb onto the polyelectrolyte complex resin. Moreover, the high permeability of the polyelectrolyte complex resins makes the use of uncharged bacteriocide hazardous because residual amounts of such bacteriocides may remain in the coating. Steam sterilization tends to make the resins brittle. Such sterilization agents as ethylene oxide are of very low efficiency at high relative humidities, and cannot be used conveniently because the polyelectrolyte complex resins to be sterilized cannot be dried without irreversible embrittlement. Therefore, the following sterilization procedure is suggested:

(a) Soak the polyelectrolyte complex resin article for an hour in a solution of 1 part concentrated hydrochloric acid in 2 parts water.

(b) Leach the acid out until it is neutral. This is done with a standard sterile saline solution until the leaching solution remains neutral.

(c) Soak in sterile 0.1 normal NaOH for an hour.

(d) Leach to neutrality once again.

(e) Soak in sterile saline overnight.

What is claimed is:

1. An article for use in blood processing, said article comprising synthetic polymeric blood-contacting surfaces wherein said surfaces are formed of an ionically-cross-linked polyelectrolyte complex resin in the form of a gel containing from 25% to 95% by weight of water and wherein said resin is formed of an organic polymer polyanion and an organic polymer polycation and has an excess of from 0.4 to 0.7 milliequivalent of residual anion groups associated with the polyanion over residual cation groups associated with the polycation.

2. A sterile antithrombogenic composition of matter formed of ionically crosslinked polyelectrolyte resin in the form of a gel comprising from 25% to 95% by weight of water, said polyelectrolyte resin being formed of an organic polymer polyanion and an organic polymer polycation and having an excess of from about 0.4 to 0.7 milliequivalent of excess polyanion-associated anion over polycation-associated cation per gram of resin.

3. An article as defined in claim 1 wherein said polyanion is poly(sodium styrene sulfonate).

4. An article as defined in claim 1 wherein said polycation is polyvinyl benzyltrimethyl ammonium chloride.

5. An article as defined in claim 1 comprising an ionically-cross-linked polyelectrolyte complex resin coated over a substrate of glass or of a polyolefin.

6. A process for forming an antithrombogenic material comprising purifying a strong polyanion and a strong polycation to remove a major portion of any impurities therefrom, forming an ionically-cross-linked polyelectrolyte complex resin from them with a stoichiometric excess of organic polymer polyanion-associated anions over organic polymer polycation-associated cations, said resin being in the form of a gel comprising 25% to 95% water.

References Cited

UNITED STATES PATENTS

| | | | |
|---|---|---|---|
| 2,832,746 | 4/1958 | Jackson | 260—45.5 |
| 3,271,496 | 9/1966 | Michaels | 264—232 |
| 3,276,598 | 10/1966 | Michaels et al. | 210—500 |
| 3,324,068 | 6/1967 | Michaels | 260—30.6 |

OTHER REFERENCES

Michaels, "Polyelectrolyte Complexes," Industrial and Engineering Chemistry 57 (10), 40 (1965).

Mirkovitch, Velimir; Cleveland Clinical Quarterly, vol. 30, October 1963, pp. 241–252, Copy in class 128—334.

Mustard, W. T. et al., Surgery 32, No. 5, November 1952, pp. 803–810, Copy in class 128—Heart Lung Digest.

HAROLD D. ANDERSON, Primary Examiner

E. NIELSEN, Assistant Examiner

U.S. Cl. X.R.

23—258.5; 117—161; 260—2.1, 2.2, 29.6, 30.2, 30.4, 32.8, 33.2, 33.4; 264—210